(12) United States Patent
Okuyama et al.

(10) Patent No.: US 9,057,812 B2
(45) Date of Patent: Jun. 16, 2015

(54) LENS HOLDER DRIVING DEVICE CAPABLE OF EASILY MOUNTING UPPER ELASTIC MEMBER TO OUTER YOKE

(71) Applicants: Atsushi Okuyama, Tokyo (JP);
  Noriyuki Kobayashi, Tokyo (JP)

(72) Inventors: Atsushi Okuyama, Tokyo (JP);
  Noriyuki Kobayashi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 175 days.

(21) Appl. No.: 13/752,585

(22) Filed: Jan. 29, 2013

(65) Prior Publication Data

US 2013/0194490 A1 Aug. 1, 2013

(30) Foreign Application Priority Data

Jan. 31, 2012 (JP) .................................. 2012-018064

(51) Int. Cl.

| G02B 7/02 | (2006.01) |
|---|---|
| H02K 41/03 | (2006.01) |
| G02B 7/04 | (2006.01) |
| G02B 27/64 | (2006.01) |
| G03B 3/10 | (2006.01) |
| G03B 13/36 | (2006.01) |
| G02B 7/08 | (2006.01) |
| H02K 41/035 | (2006.01) |
| H04N 5/225 | (2006.01) |
| G11B 7/09 | (2006.01) |

(52) U.S. Cl.
CPC .. *G02B 7/02* (2013.01); *G02B 7/04* (2013.01); *G02B 27/646* (2013.01); *G03B 3/10* (2013.01); *G03B 13/36* (2013.01); *H02K 41/03* (2013.01); *H04N 5/225* (2013.01); *G11B 7/0925* (2013.01); *G02B 7/08* (2013.01); *H02K 41/0356* (2013.01)

(58) Field of Classification Search
CPC .............. G02B 7/02; G02B 7/04; G02B 7/08;
G02B 7/102; G02B 27/64; G02B 27/646;
H02K 41/03; H02K 41/031; H02K 5/225;
G03B 3/10; G03B 13/00; G03B 13/18;
G03B 13/32; G03B 13/34; G03B 13/36;
G11B 7/0908; G11B 7/0925; G11B 7/0927;
G11B 7/093; G11B 7/0932; G11B 7/0935;
G11B 7/1201
USPC ............... 359/814, 819, 823, 824; 310/12.04,
310/12.16, 14; 348/208.11, 340, 345, 357,
348/374, 375; 396/52, 55, 85
See application file for complete search history.

(56) References Cited

U.S. PATENT DOCUMENTS

| 8,077,398 B2 * | 12/2011 | Osaka et al. ................... 359/696 |
| 8,102,612 B2 * | 1/2012 | Sue et al. ....................... 359/824 |
| 8,164,842 B2 * | 4/2012 | Shiraki et al. ................. 359/824 |

(Continued)

FOREIGN PATENT DOCUMENTS

JP       2009-251031       10/2009

*Primary Examiner* — Loha Ben
(74) *Attorney, Agent, or Firm* — Holtz, Holtz, Goodman & Chick PC

(57) ABSTRACT

A lens holder driving device includes a lens holder in which a lens assembly is mounted, a driving coil fixed to the lens holder at outside circumference thereof, a magnet opposite to the driving coil, a yoke including the magnet, an elastic member supporting the lens holder in a direction of an optical axis shiftably, and a base disposed at a lower side of the lens holder. The yoke includes an outer yoke including the magnet at an inner wall surface thereof. The elastic member includes an upper elastic member disposed at an upper side of the lens holder. The upper elastic member is mounted to the inner wall of the outer yoke in a state where the upper elastic member is positioned and fitted to a spacer.

17 Claims, 18 Drawing Sheets

(56) References Cited

U.S. PATENT DOCUMENTS

| | | | |
|---|---|---|---|
| 8,189,280 B2 * | 5/2012 | Ollila et al. | 359/824 |
| 8,194,336 B2 * | 6/2012 | Kimoto | 359/824 |
| 8,310,774 B2 * | 11/2012 | Lee | 359/824 |
| 8,503,119 B2 * | 8/2013 | Sato et al. | 359/824 |
| 8,531,789 B2 * | 9/2013 | Osaka et al. | 359/824 |
| 8,836,177 B2 * | 9/2014 | Lee et al. | 310/12.16 |
| 2013/0194491 A1 * | 8/2013 | Kudo | 348/375 |

* cited by examiner

LENS HOLDER DRIVING DEVICE CAPABLE OF EASILY MOUNTING UPPER ELASTIC MEMBER TO OUTER YOKE

This application is based upon and claims the benefit of priority from Japanese Patent Application No. JP 2012-018064, filed on Jan. 31, 2012, the disclosure of which is incorporated herein in its entirety by reference.

BACKGROUND OF THE INVENTION

This invention relates to a lens holder driving device and, in particular, to an autofocus lens holder driving device for use in a compact camera.

Camera-equipped cellular mobile phones mount compact cameras therein. The compact camera is provided with an autofocus lens holder driving device. Previously, various autofocus lens holder driving devices have been proposed.

By way of illustration, Japanese Unexamined Patent Application Publication No. 2009-251031 (JP-A-2009-251031) (which will be also called Patent Document 1) discloses a lens driving device which is capable of decreasing a parts count and of miniaturizing. The lens driving device disclosed in Patent Document 1 comprises a lens holder in which a lens assembly can be mounted, a driving coil (a coil) fixed to the lens holder at outside circumstance thereof, a magnet opposite to the driving coil, an outer yoke including the magnet, an elastic member (an upper elastic member and a lower elastic member) for supporting the lens holder in a direction of an optical axis of the lens assembly shiftably, and a base disposed at a lower side of the lens holder. In Patent Document 1, the elastic member (the upper elastic member and the lower elastic member) is disposed in the inside of the outer yoke.

In addition, in the lens driving device disclosed in the above-mentioned Patent Document 1, each of the upper elastic member and the lower elastic member comprises an inner end portion mounted to the lens holder and an outer end portion mounted to the outer yoke. The above-mentioned Patent Document 1, as a second exemplary embodiment, comprises a spacer at a corner portion of the outer yoke as a holding member for holding the outer end portion of the upper elastic member.

The lens holder driving device disclosed in the above-mentioned Patent Document 1 further comprises an inner yoke (a back yoke) for fixing the outer end portion of the lower elastic member via a spacer. The inner yoke comprises an inner ring end portion mounted to an inner wall of an outer hollow cylindrical portion of the outer yoke at a lower end thereof and a plurality of vertical extending portions which extend in parallel with the optical axis vertically upwards at the inside of the inner ring end portion. The driving coil is disposed between the plurality of vertical extending portions of the inner yoke and the magnet.

In the above-mentioned lens driving device disclosed in Patent Document 1, the outer end portion of the upper elastic member is held and fixed to the corner portion of the inner wall of the outer yoke via the spacer. It is therefore difficult to easily mount the upper elastic member to the outer yoke and it is also difficult to position the upper elastic member to the outer yoke.

In addition, in the lens driving device disclosed in Patent Document 1, the inner yoke (the back yoke) is mounted to the inner wall of the outer hollow cylindrical portion of the outer yoke at the lower end thereof. It is therefore difficult to easily assemble the lens driving device.

SUMMARY OF THE INVENTION

It is therefore an exemplary object of the present invention to provide a lens holder driving device which is capable of positioning and easily mounting an upper elastic member to an outer yoke.

It is another exemplary object of the present invention to provide a lens holder driving device which is capable of easily assembling it.

Other objects of this invention will become clear as the description proceeds.

On describing the gist of an exemplary aspect of this invention, it is possible to be understood that a lens holder driving device comprises a lens holder for holding a lens assembly, a driving coil fixed to the lens holder at outside circumference thereof, a magnet opposite to the driving coil, a yoke including the magnet, an elastic member supporting the lens holder in a direction of an optical axis of the lens assembly shiftably, and a base disposed at a lower side of the lend holder. According to the exemplary aspect of this invention, the yoke comprises an outer yoke including the magnet at an inner wall surface thereof. The elastic member comprises an upper elastic member disposed at an upper side of the lens holder. The upper elastic member is mounted to the inner wall of the outer yoke in a state where the upper elastic member is positioned and fitted to a spacer.

DESCRIPTION OF EMBODIMENTS

Figure 1:
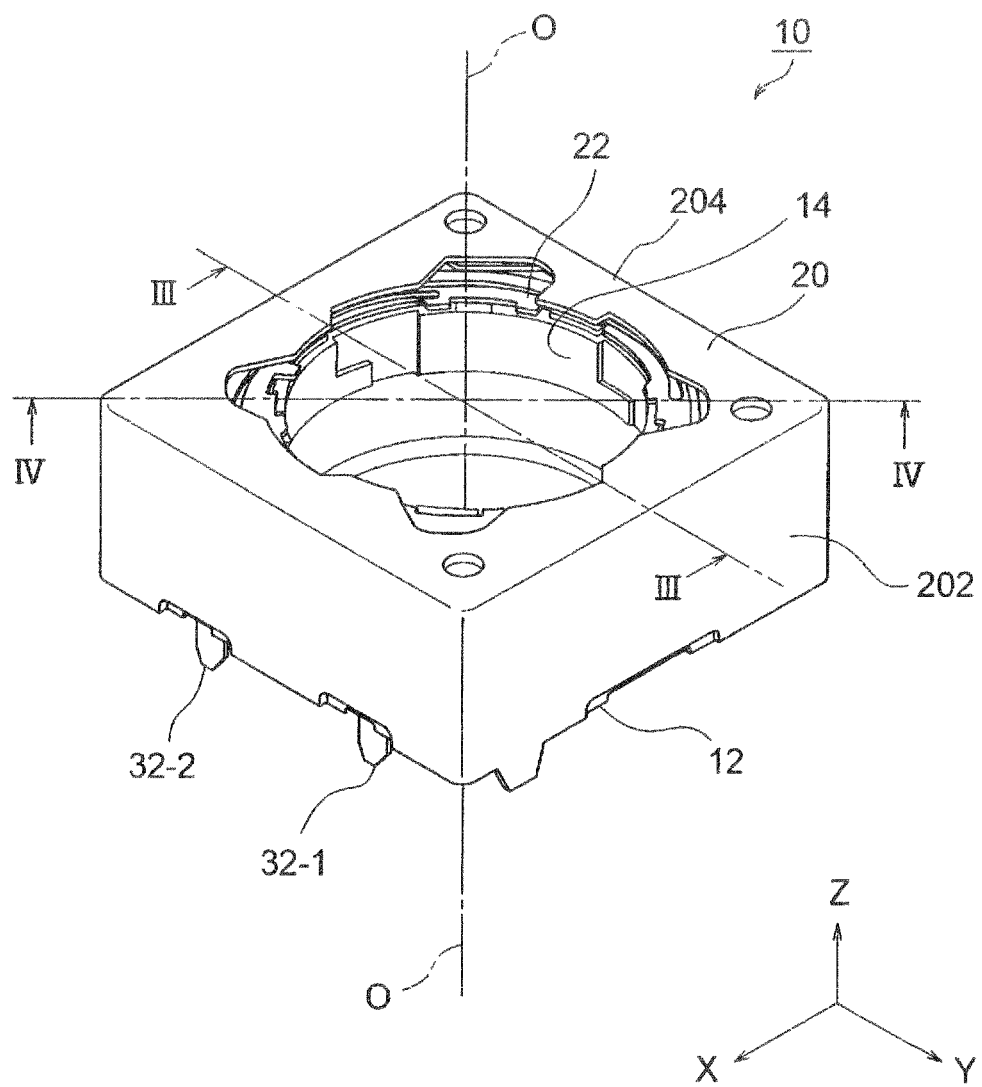
FIG. 1 is a perspective view of a lens holder driving device according to an exemplary embodiment of the present invention.
Figure 2:
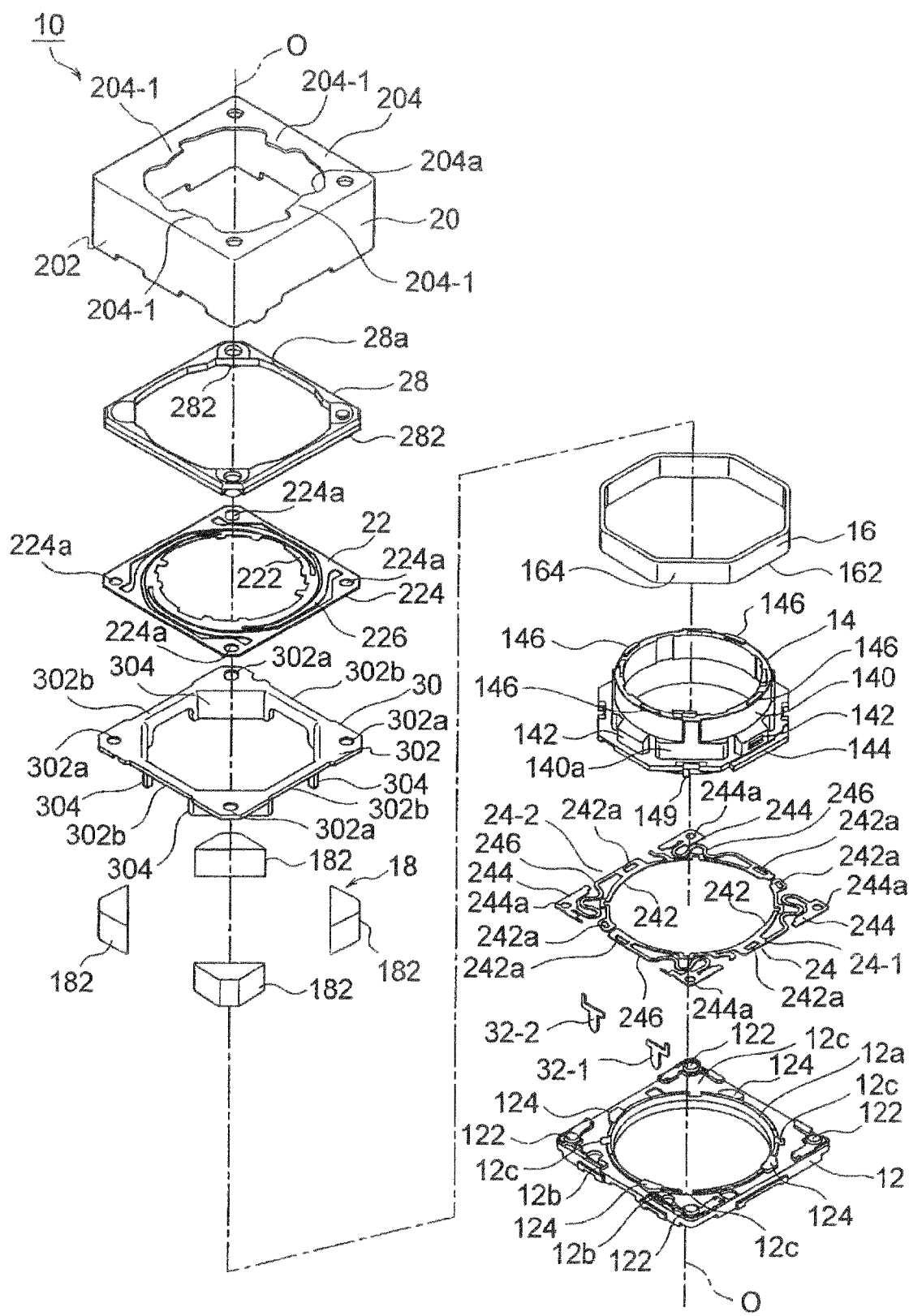
FIG. 2 is an exploded perspective view of the lens holder driving device illustrated in FIG. 1.
Figure 3:
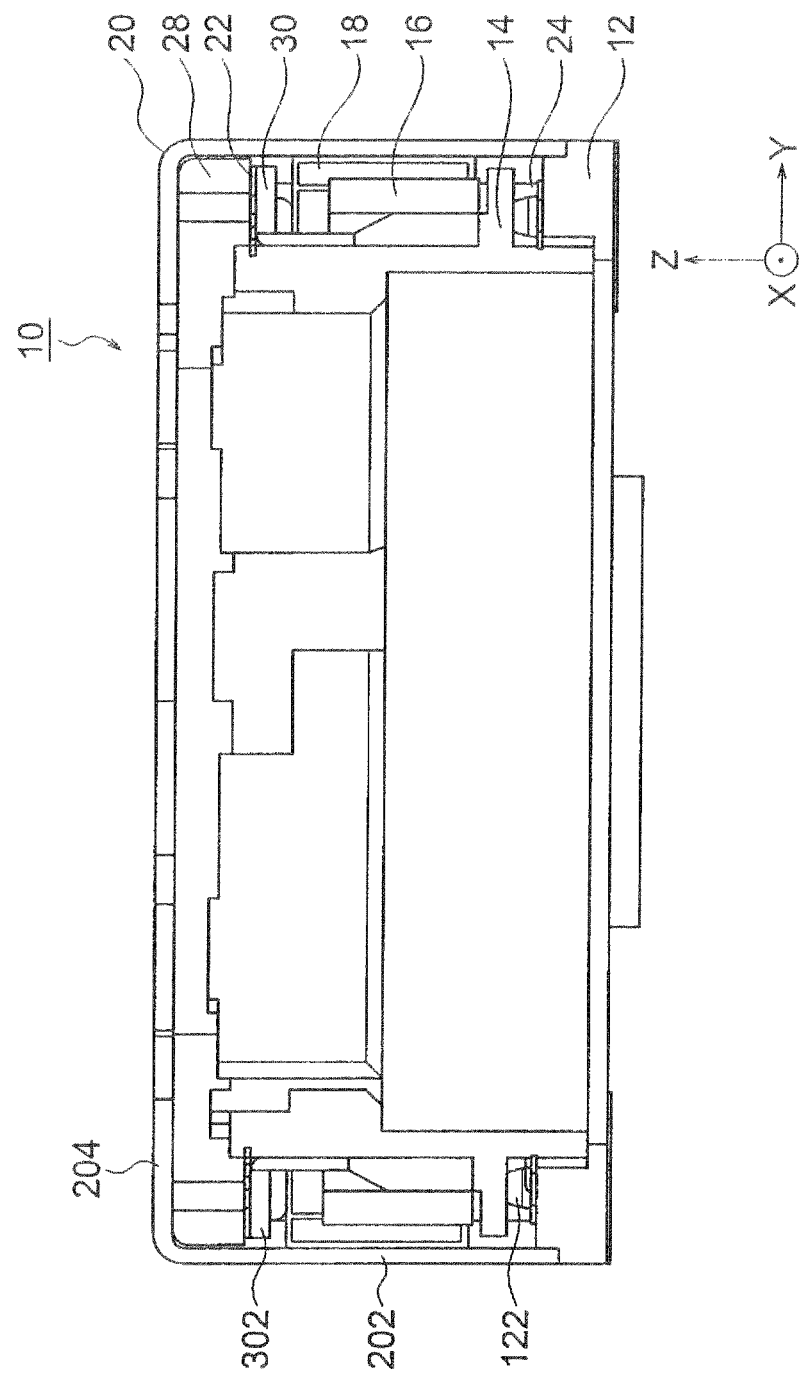
FIG. 3 is a cross sectional view taken on line III-III of FIG. 1.
Figure 4:
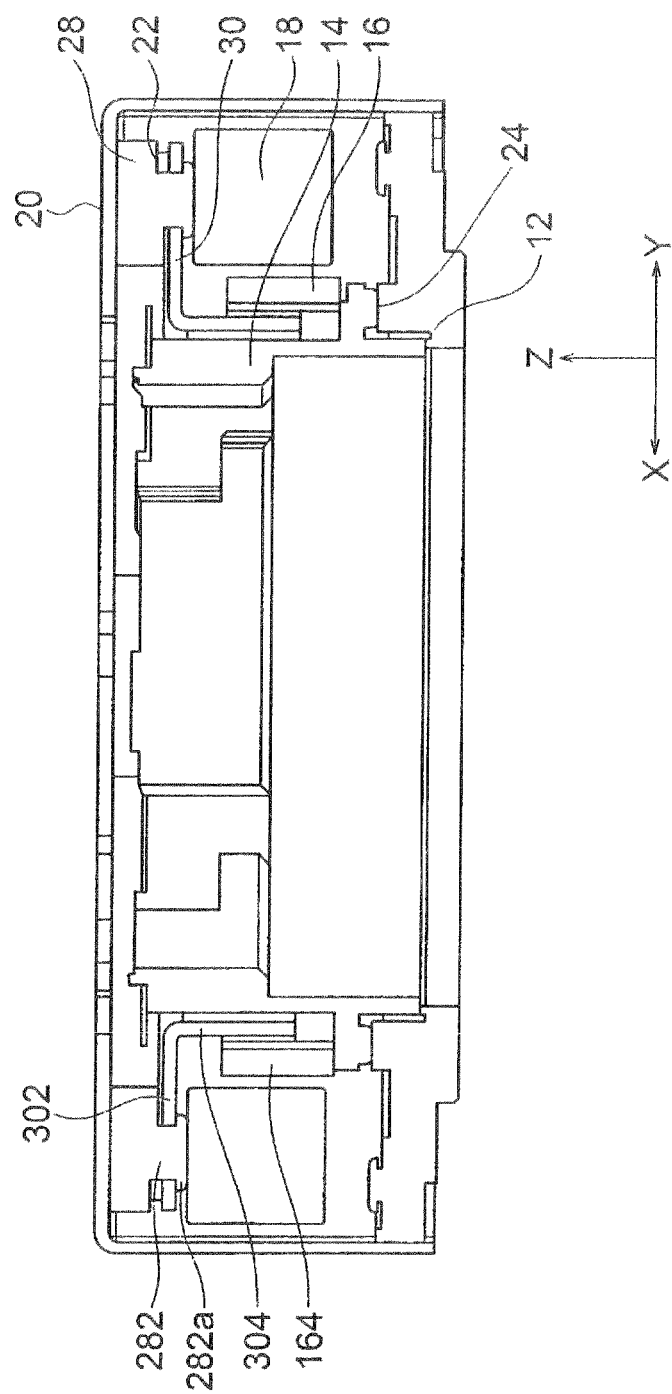
FIG. 4 is a cross sectional view taken on line IV-IV of FIG. 1.

Referring to FIGS. 1 through 4, the description will proceed to a lens holder driving device 10 according to an exemplary embodiment of this invention. FIG. 1 is a perspective view of the lens holder driving device 10 and FIG. 2 is an exploded perspective view of the lens holder driving device 10. FIG. 3 is a cross-sectional view taken on line III-III of FIG. 1. FIG. 4 is a cross-sectional view taken on line IV-IV of FIG. 1. Herein, in the manner shown in FIGS. 1 through 4, an orthogonal coordinate system (X, Y, Z) is used. In a state illustrated in FIGS. 1 through 4, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 1 through 4, the up-and-down direction Z is a direction of an optical axis O of a lens.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrated lens holder driving device 10 is a lens holder driving device comprising, as a driving source (a driving method), a driving portion (a VCM method) of "moving coil method" using a voice coil motor (VCM).

Figure 5:
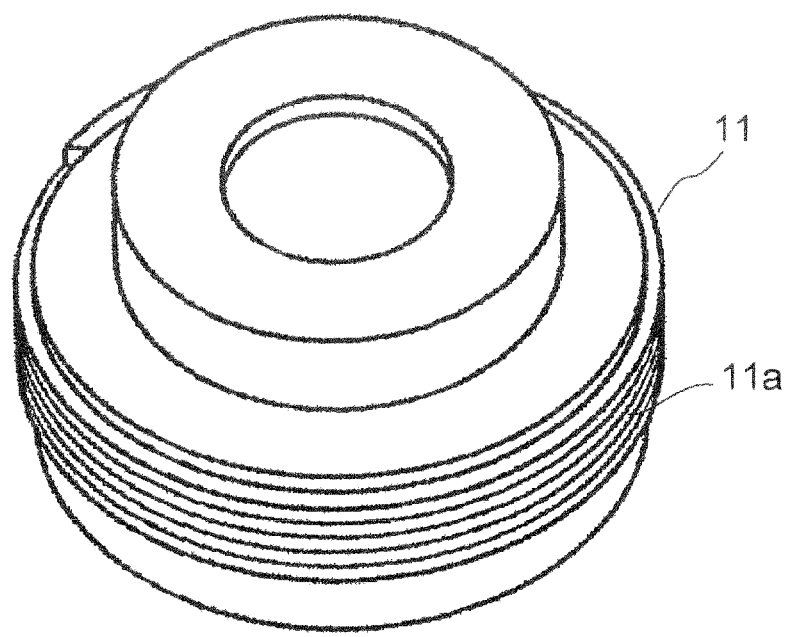
FIG. 5 is a perspective view of a lens assembly mounted in the lens holder driving device illustrated in FIG. 1.

The illustrated lens driving device 10 is mounted to a mobile terminal such as a camera-equipped cellular mobile phone which is enable to automatic focusing, a smart phone, a notebook personal computer, a tablet-type personal computer, a mobile-type game machine, a Web camera, a vehicle-mounted camera, or the like. The lens holder driving device 10 is for moving the lens holder 14 (which will later be described) capable of mounting a lens assembly (a lens barrel) 11 as shown in FIG. 5 in the direction of the optical axis O. The lens holder driving device 10 comprises a base 12 which is disposed in a lower side (a rear side) in the Z-axis direction (the direction of the optical axis O). The actuator base 12 has a lower portion (a rear portion) on which an image pickup device 13 disposed on a module board (not shown) is mounted, as shown in FIG. 6.

Figure 6:
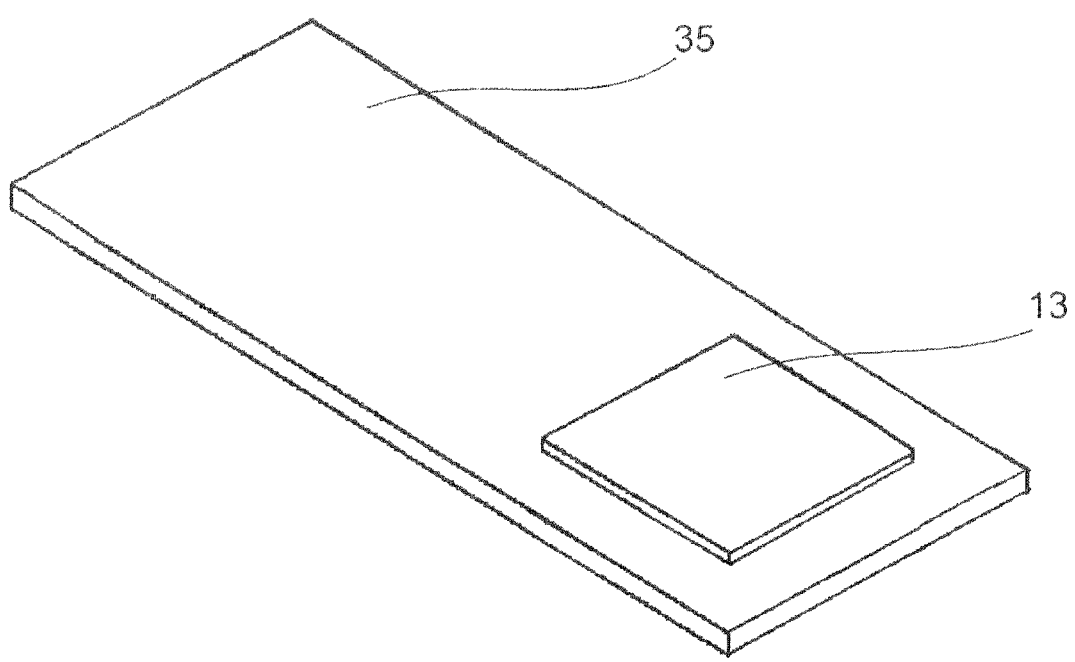
FIG. 6 is a perspective view of a image pickup device mounted on a printed wiring board (PWB) that is mounted in the lens holder driving device illustrated in FIG. 1.

More specifically, as shown in FIG. 6, the image pickup device 13 is mounted on a printed wiring board (PWB) 35. That is, the printed wiring board (PWB) 35 mounts other circuit elements (not shown) as well as the image pickup device 13 thereon which constitute a printed circuit board (PCB). An infrared (IR) cut filter (not shown) is mounted in the module board. The printed circuit board (PCB) is mounted to the base 12 via the module board.

The image pickup device 13 picks up a subject image formed by the lens assembly 11 to convert it into an electric signal. The image pickup device 13 may, for example, comprise a CCD (charge coupled device) type image sensor, a CMOS (complementary metal oxide semiconductor) type image sensor, or the like. Accordingly, a camera module 40 comprises a combination of the lens holder driving device 10, the module board, and the image pickup device 13.

Figure 7:
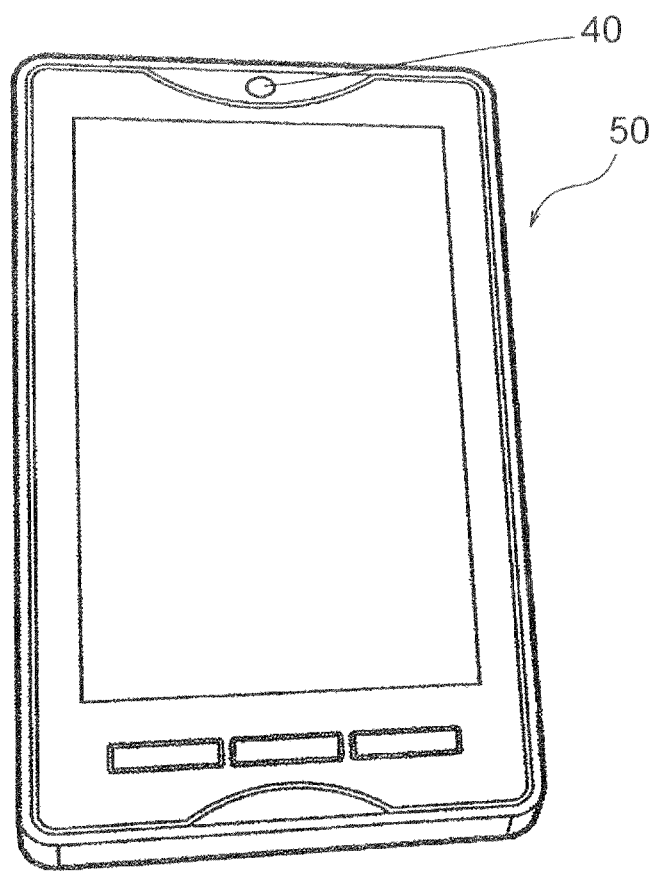
FIG. 7 is a perspective view of a camera-equipped mobile terminal (a smart phone) in which the lens holder driving device illustrated in FIG. 1 is mounted.

FIG. 7 is a perspective view showing appearance of a camera-equipped mobile terminal 50 on which the camera module 40 is mounted. The illustrated camera-equipped mobile terminal 50 comprises a smart phone. The camera module 40 is mounted at a predetermined portion of the camera-equipped mobile terminal 50. With this structure, a user can shoot using the camera-equipped mobile terminal 50.

Although this example shows by taking as an example in a case of the smart phone as the camera-equipped mobile terminal 50, the camera-equipped mobile terminal may be a camera-equipped cellular mobile phone, a notebook personal computer, a tablet-type personal computer, a mobile-type game machine, a Web camera, and a vehicle-mounted camera.

Turning back to FIG. 2, the base 12 has a ring-shape which has the outside shape of rectangular and which has a circular opening portion 12a in the inside thereof. In the example being illustrated, a material of the base 12 comprises a material having a high size precision and high heat resistance. Such a material may be, for example, POTICON (registered trademark) of Otsuka Chemical Co. Ltd or a liquid crystal polymer (LCP).

The lens holder driving device 10 comprises the lens holder 14 including a tubular portion 140 for holding the lens assembly (the lens barrel) 11 (FIG. 5), a ring-shaped driving coil 16 fixed to the lens holder 14 so as to position around the tubular portion 140 thereof, a permanent magnet 18 opposite to the driving coil 16, an outer yoke 20 comprising the permanent magnet 18 at an inner wall surface thereof, an inner yoke 30, and a pair of elastic members 22 and 24 disposed to both sides of the tubular portion 140 of the lens holder 14 in the direction of the optical axis O.

A combination of the lens assembly 11 and the lens holder 14 is called a lens body. The permanent magnet 18, the outer yoke 20, and the inner yoke 30 constitute a magnetic circuit (18, 20, 30). A combination of the magnetic circuit (18, 20, 30) and the driving coil 16 comprises the driving portion of the moving coil method.

The pair of elastic members 22 and 24 supports the lens holder 14 in the direction of the optical axis O shiftably so as to position the lens holder 14 in a radial direction. In the pair of elastic members 22 and 24, one elastic member 22 is called an upper elastic member while another elastic member 24 is called a lower elastic member. The illustrated elastic members comprise leaf springs. Accordingly, the upper elastic member 22 is also called an upper leaf spring while the lower elastic member 24 is also called a lower leaf spring.

In addition, in the manner which is described above, in the actual use situation, the upper direction in the Z-axis direction (the direction of the optical axis O) becomes the front direction while the lower direction in the Z-axis direction (the direction of the optical axis O) becomes the rear direction. Accordingly, the upper elastic member (the upper leaf spring) 22 is also called a front-side spring while the lower elastic member (the lower leaf spring) 24 is also called a rear-side spring.

The upper elastic member (the upper leaf spring; the front-side spring) 22 and the lower elastic member (the lower leaf spring; the rear-side spring) 24 are made, for example, of metal such as a stainless steel or a beryllium copper. In addition, each of the upper elastic member (the upper leaf spring; the front-side spring) 22 and the lower elastic member (the lower leaf spring; the rear-side spring) 24 is manufactured by a press working against a predetermined thin plate or an etching working using photolithography technique. The etching working is desirable than the press working. This is because residual stress does not remain in the leaf spring in the etching working.

The outer yoke 20 has a rectangular cylindrical shape. Specifically, the outer yoke 20 comprises an outer hollow cylindrical portion 202 having the rectangular cylindrical shape and a rectangular outer ring end portion 204 projecting from an upper end (a front end) of the outer hollow cylindrical portion 202 inward. The outer hollow cylindrical portion 202 is also called a shielding yoke.

On the other hand, the driving coil 16 has an octagonal cylindrical shape. More specifically, the driving coil 16 comprises four long side portions 162 and four short side portions 164 disposed between the four long side portions. The tubular portion 140 of the lens holder 14 has four bonded surfaces 142 which project in the radial direction outward at regular spacings of 90 degrees around the optical axis O. To the four bonded surfaces 142, inner surfaces of the four long side portions 162 of the driving coil 16 are bonded by means of adhesives. In addition, the lens holder 14 has, at a lower end portion thereof, an octagonal ring-shaped end portion 144 which projects in the radial direction outward and which is for positioning a bottom portion of the driving coil 16.

In the manner which is described above, the lens holder 14 has the four bonded surfaces 142 for bonding the four areas of the inner surface of the driving coil 16 (that are the inner surfaces of the four long side portions 162 in the example being illustrated) to the tubular portion 140 by means of the adhesives (the adhesive resin). In the example being illustrated, a material of the lens holder 14 comprises a polycarbonate (PC).

On the other hand, the permanent magnet 18 comprises four permanent magnet pieces 182 each of which has a substantially triangular pillar shape and which are disposed opposite to the short side portions 164 of the driving coil 16. The four permanent magnet pieces 182 are disposed to inner walls at four corners of the outer hollow cylindrical portion (the shielding yoke) 202 of the outer yoke 20. In addition, in actuality, each permanent magnet piece 182 is a trapezoid in cross section in a direction orthogonal to the direction of the optical axis O.

In the manner which is described above, the permanent magnet 18 comprises the four permanent magnet pieces 182 each having the substantially triangular pillar shape that are mounted to the four corners of the outer hollow cylindrical portion (the shielding yoke) 202 of the outer yoke 20. The outer ring end portion 204 has an opening 204a.

As shown in FIG. 4, at the inner surfaces of the four corners of the outer hollow cylindrical portion (the shielding yoke) 202 of the outer yoke 20, the permanent magnet 18 is disposed with a space between it and the driving coil 16.

The upper elastic member (the upper leaf spring; the front-side spring) 22 is disposed at an upper side (a front side) of the lens holder 14 in the direction of the optical axis O while the lower elastic member (the lower leaf spring; the rear-side spring) 24 is disposed at a lower side (a rear side) of the lens holder 14 in the direction of the optical axis O.

More specifically, the upper elastic member (the upper leaf spring; the front-side spring) 22 comprises an inner end portion 222 mounted on the lens holder 14 and an outer end portion 224 mounted on the outer yoke 20 via a spacer 28 in the manner which will later be described. Between the inner end portion 222 and the outer end portion 224, four arm portions 226 are provided. Each arm portion 226 connects the inner end portion 222 to the outer end portion 224.

On the other hand, the lower elastic member (the lower leaf spring; the rear-side spring) 24 comprises an inner end portion 242 mounted on the lens holder 14 at a lower end thereof and an outer end portion 244 mounted on the base 12 in the manner which will later be described. Between the inner end portion 242 and the outer end portion 244, four arm portions 246 are provided. Each arm portion 246 connects the inner end portion 242 to the outer end portion 244.

In addition, the inner end portion is also called an inner ring while the outer end portion is also called an outer ring.

The inner end portion 222 of the upper elastic member (the upper leaf spring; the front-side spring) 22 is fixed to the upper end of the lens holder 14. On the other hand, the outer end portion 224 of the upper elastic member (the upper leaf spring; the front-side spring) 22 is adhesively fixed to the outer yoke 20 via the spacer 28. In the example being illustrated, a material of the spacer 28 comprises a polycarbonate (PC).

In the example being illustrated, the upper elastic member (the upper leaf spring; the front-side spring) 22 is disposed between the spacer 28 and the inner yoke 30. The inner yoke 30 is also called a counter yoke or a back yoke. In addition, these three parts are integrated as one structure (22, 28, 30) by heat-welding in the manner which will later be described.

More specifically, the spacer 28 has a rectangular ring shape which has an opening portion 28a at a central portion thereof. The spacer 28 comprises four protrusions 282 which project at four corners thereof upward. These four protrusions 282 serve as heat-welding portions in the manner which will later be described. The outer end portion 224 of the upper elastic member (the upper leaf spring; the front-side spring) 22 has four through holes 224a through which the four protrusions 282 of the spacer pass.

On the other hand, the inner yoke (the counter yoke; the back yoke) comprises a rectangular ring-shaped inner ring end portion 302 mounted to an inner wall of the outer hollow cylindrical portion 202 of the outer yoke 20 at an upper end side thereof and four vertical extending portions 304 which extend in parallel with the optical axis O vertically downwards at the inside of four corners of the inner ring end portion 302. The inner ring end portion 302 has four fitting holes 302a in which the four protrusions 282 of the spacer 28 fit.

Accordingly, as shown in FIG. 4, the above-mentioned structure (22, 28, 30) is assembled by fitting the four protrusions 282 of the spacer 28 in the four fitting holes 302a of the inner ring end portion 302 of the inner yoke 30 through the four through holes 224a of the outer end portion 224 of the upper elastic member 22 and by heat-welding tips of the four protrusions 282. The structure (22, 28, 30) is mounted to the inner wall surface of the outer yoke 20 by means of adhesive. In the manner which is described above, the upper elastic member 22 is mounted to the spacer 28 by heat-welding the tips of the four protrusions 282 of the spacer 28.

As shown in FIG. 4, by the above-mentioned heat-welding, heat-welded portions 282a are formed at the respective tips of the four protrusions 282 of the spacer 28. By the heat-welded portions 282a, the four permanent magnet pieces 182 are positioned. In other words, the inner ring end portion 302 of the inner yoke 30 and the permanent magnet 18 are apart from each other by the head-welded portions 282a.

In addition, the inner ring end portion 302 of the inner yoke 30 has hollow portions 302b at four outer sides thereof. This is for facilitating to insert the above-mentioned structure (22, 28, 30) in the outer yoke 20.

Although mounting (fixing) of the structure (22, 28, 30) to the outer yoke 20 is carried out by adhesive in the example being illustrated, the mounting (the fixing) may be carried out by laser welding or heat-welding. Herein, in "the laser welding", the structure (22, 28, 30) is fused to the inner wall surface of the outer yoke 20 by irradiating laser light to the outer ring-shaped end portion 204 of the outer yoke 20 from the outside. In "the heat-welding", the structure (22, 28, 30) is mounted to the outer yoke 20 by forming, in the spacer 28, a plurality of protrusions projecting upwards, by forming, in the outer ring-shaped end portion 204 of the outer yoke 20, a plurality of holes in which the plurality of protrusions are inserted, and by heat-welding tips of the plurality of protrusions.

Inasmuch as the upper elastic member 22 is heat-welded to the spacer 28 in this exemplary embodiment in the manner which is described above, it is possible to easily mount the upper elastic member 22 to the outer yoke 20 and it is possible to easily position the upper elastic member 22 with respect to the outer yoke 20.

In addition, a yoke comprises the outer yoke 20 and the inner yoke 30 in this exemplary embodiment. It is therefore advantageous in that it increases flexibility in design of the yoke. In addition, inasmuch as the inner yoke (the counter yoke; the back yoke) 30 is mounted to the inner wall of the outer hollow cylindrical portion of the outer yoke 20, it is possible to easily assemble the lens holder driving device 10.

In addition, although the upper elastic member 22 is mounted to the spacer 28 by heat-welding the tips of the plurality of protrusions 282 of the spacer 28 in the above-mentioned exemplary embodiment, the spacer 29 and the upper elastic member 22 may be mounted to each other by adhesive. In this event, the inner yoke 30 is also mounted to the spacer 28 by adhesive.

In the manner which is described above, the inner end portion 242 of the lower elastic member (the lower leaf spring; the rear-side spring) 24 is fixed to a lower end side of the lens holder 14. On the other hand, the outer end portion 244 of the lower elastic member (the lower leaf spring; the rear-side spring) 24 is fixed to the base 12.

More specifically, the base 12 has the rectangular ring shape which has the circular opening portion 12a at the central portion thereof, in the manner described above. The base 12 comprises four protrusions 122 which project at four corners thereof upward. The outer end portion 244 of the lower leaf spring 24 has four fitting holes 244a in which the four protrusions 122 fit.

Although the illustration is not made, the tubular portion 140 of the lens holder 14 has an inner wall in which a female screw thread is cut. On the other hand, as shown in FIG. 5, the lens assembly (the lens barrel) 11 has an outer wall in which a male screw thread 11a screwed in the above-mentioned female screw thread is cut. In a case of fitting the lens assembly (the lens barrel) 11 to the lens holder 14, it includes the steps of rotating the lens assembly (the lens barrel) 11 with respect to the tubular portion 140 of the lens holder 14 around the optical axis O to screw it along the direction of the optical axis O thereby accommodating the lens assembly (the lens barrel) 11 in the lens holder 14, and of connecting them to each other via an adhesive agent or the like.

Turning back to FIG. 2, the lens holder driving device 10 comprises first and second electrode terminals 32-1 and 32-2 which are for supplying the driving coil 16 with power. The base 12 has a pair of insertion holes 12b for inserting and setting the first and the second electrode terminals 32-1 and 32-2. In addition, the lower elastic member (the lower leaf spring; the rear-side spring) 24 comprises first and second leaf spring pieces 24-1 and 24-2 which are electrically insulated to each other. The first and the second electrode terminals 32-1 and 32-2 are electrically connected to the first and the second leaf spring pieces 24-1 and 24-2 by means of solder, respectively.

Accordingly, by energizing the driving coil 16 via the first and the second leaf spring pieces 24-1 and 24-2 from the first and the second electrode terminals 32-1 and 32-2, it is possible to positionally adjust the lens holder 14 (the lens assembly 11) in the direction of the optical axis O according to interaction between a magnetic field of the permanent magnet 18 and a magnetic field due to an electric current flowing through the driving coil 16.

In the above-mentioned lens holder driving device 10, a combination of the lens holder 14 for holding the lens assembly 11 and the driving coil 16 serves as a pillar movable portion (14, 16) disposed in a central portion. In addition, a combination of the base 12, the permanent magnet 18, the outer yoke 20, the spacer 28, and the inner yoke 30 acts as a tubular fixed portion (12, 18, 20, 28, 30) disposed around the movable portion (14, 16).

Figure 8:
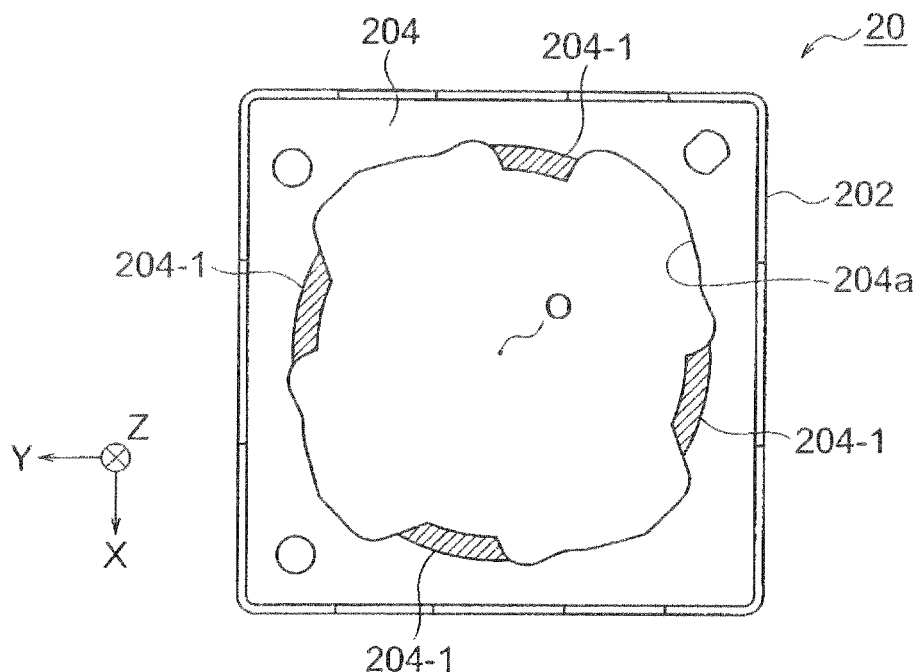
FIG. 8 is a bottom view of an outer yoke for use in the lens holder driving device illustrated in FIG. 1.
Figure 9:
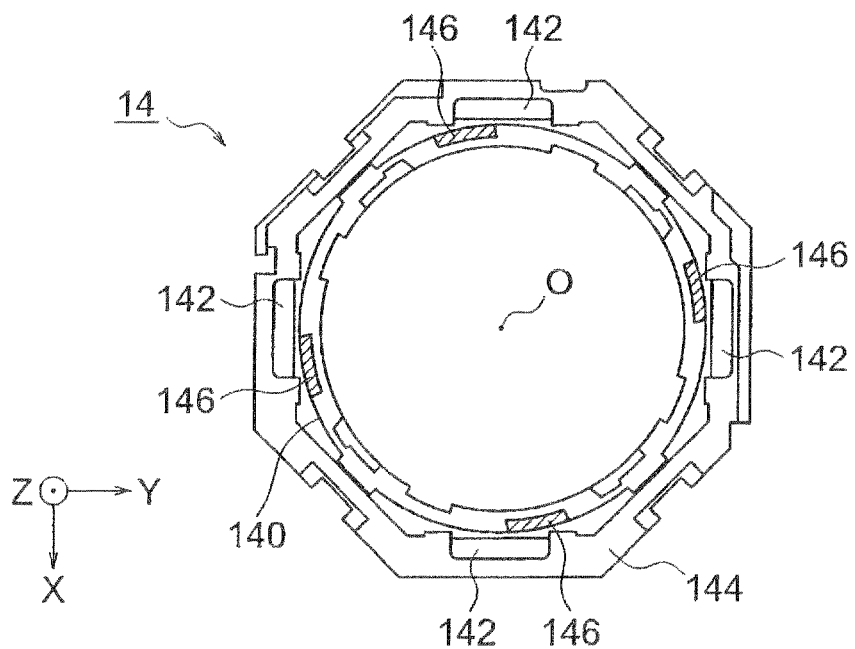
FIG. 9 is a plan view of a lens holder for use in the lens holder driving device illustrated in FIG. 1.
Figure 10:
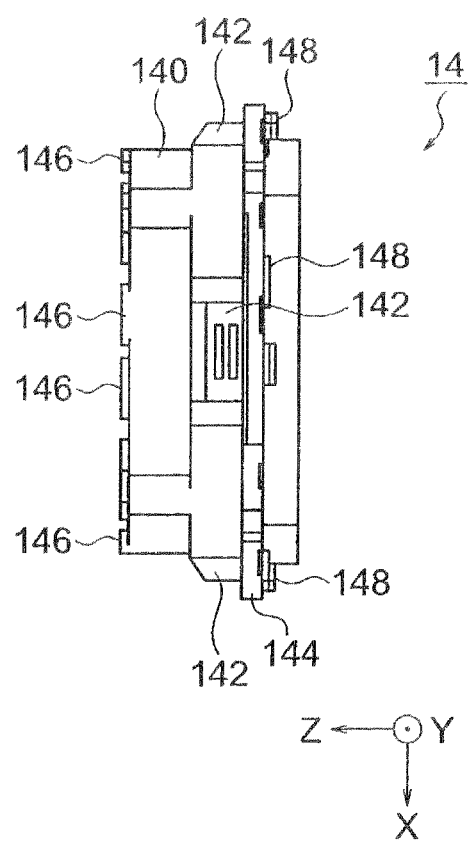
FIG. 10 is a side view of the lens holder illustrated in FIG. 9.
Figure 11:
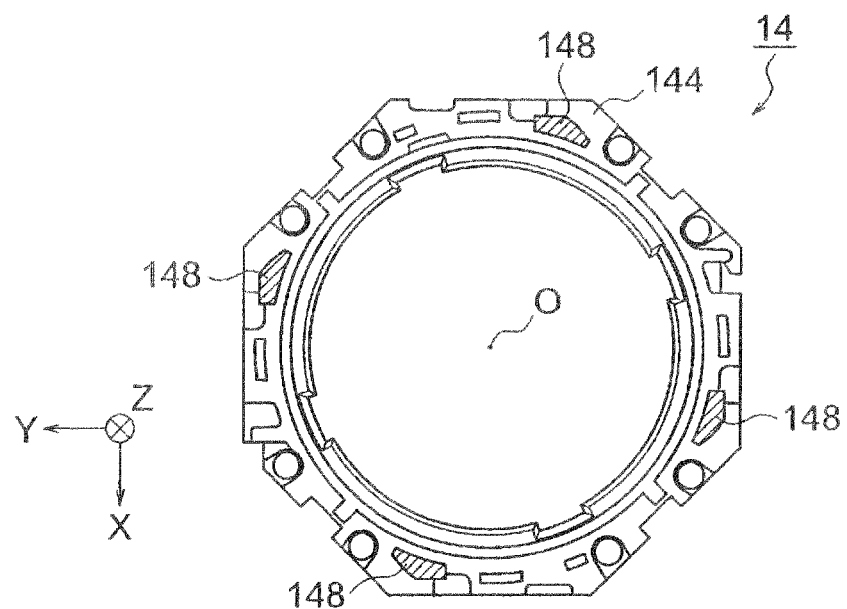
FIG. 11 is a bottom view of the lens holder illustrated in FIG. 9.
Figure 12:
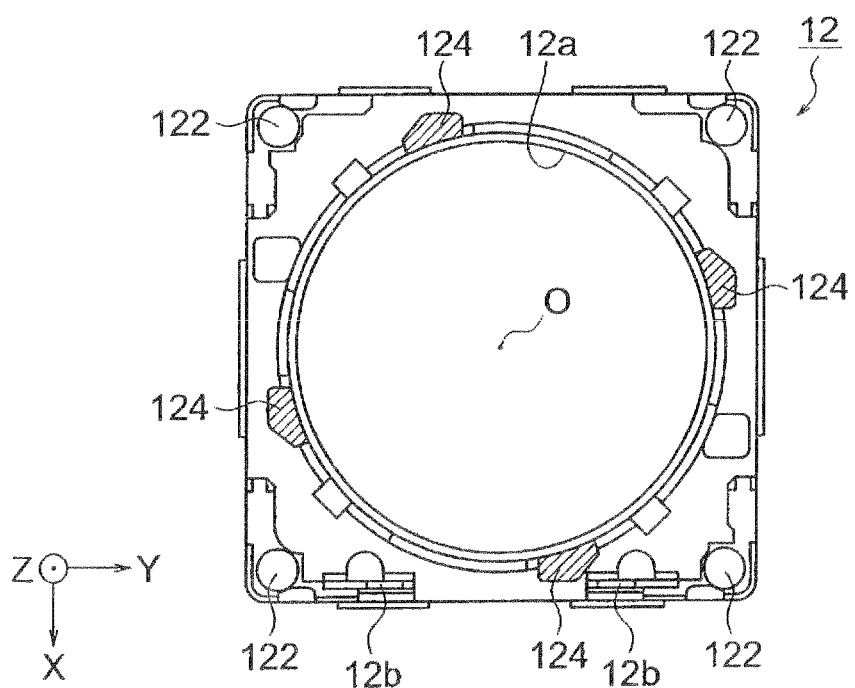
FIG. 12 is a plan view of the base for use in the lens holder driving device illustrated in FIG. 1.
Figure 13:
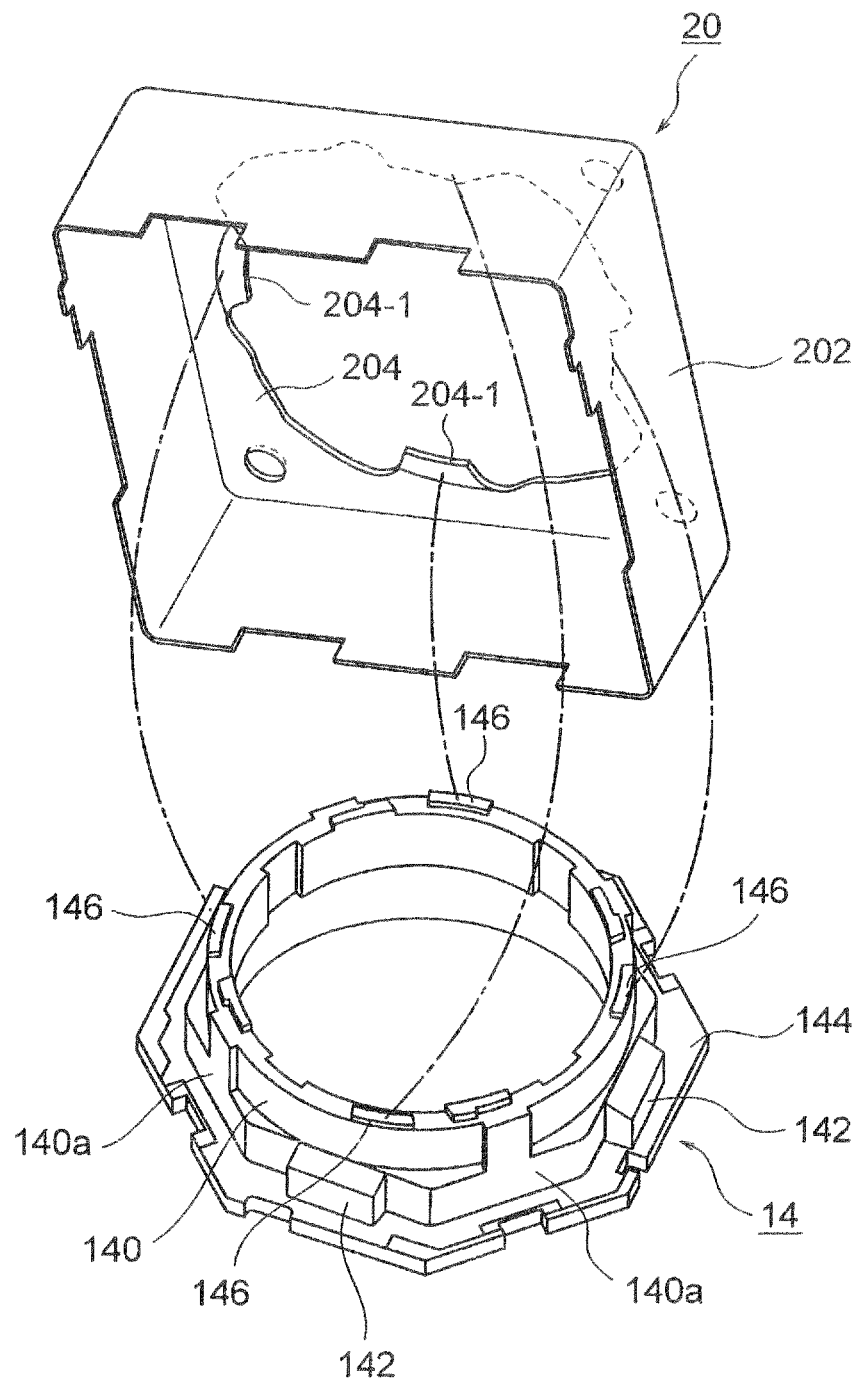
FIG. 13 is an explanation view showing stopper locations between the outer yoke and the lens holder.
Figure 14:
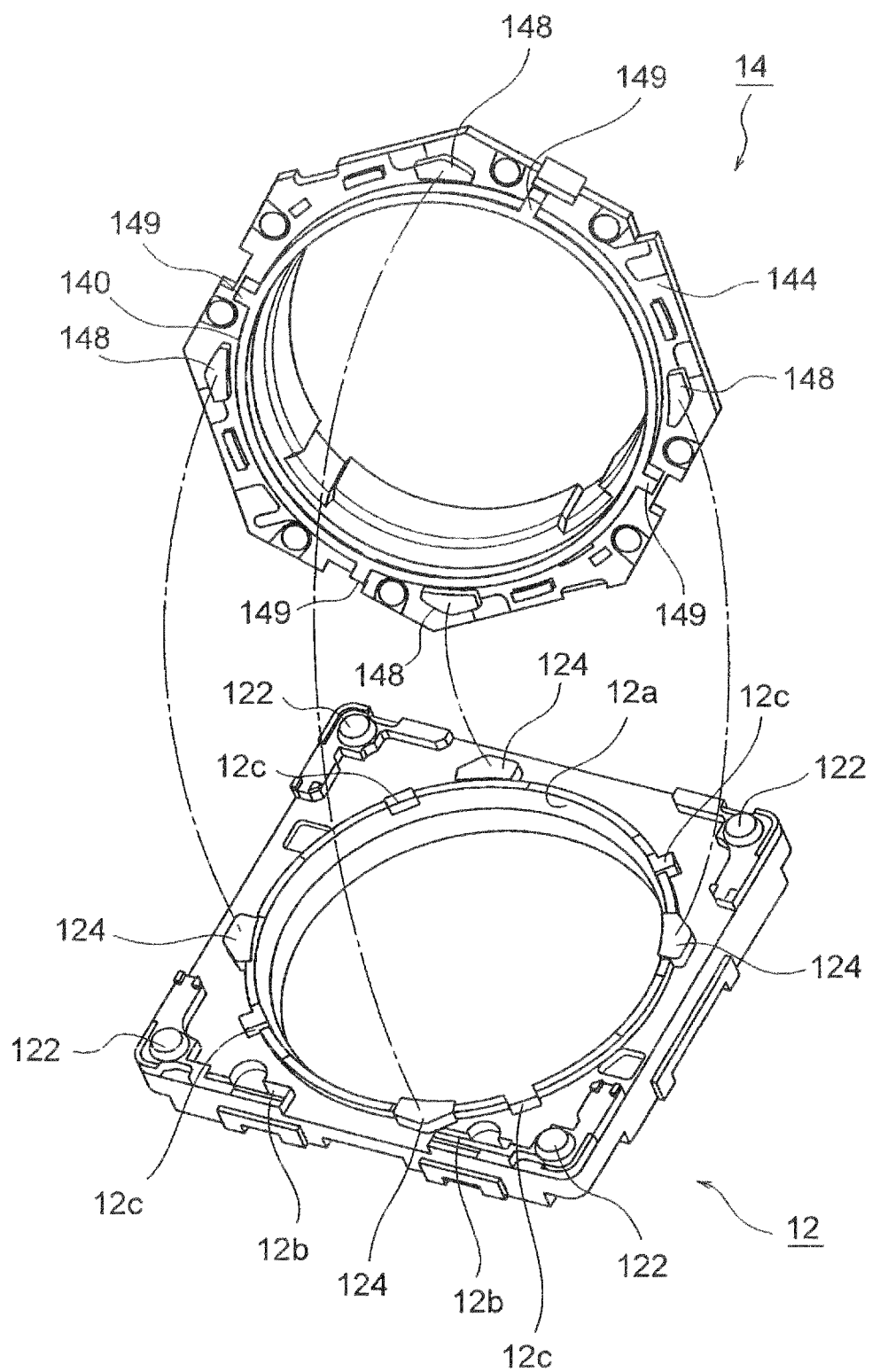
FIG. 14 is an explanation view showing stopper locations between the lens holder and the base.

Referring now to FIGS. 8 through 14, the description will proceed to stoppers in the up-and-down direction Z of the lens holder 14. FIG. 8 is a bottom view of the outer yoke 20 while FIG. 9 is a plan view of the lens holder 14. FIG. 10 is a side view of the lens holder 14. FIG. 11 is a bottom view of the lens holder 14 while FIG. 12 is a plan view of the base 12. FIG. 13 is an explanation view showing stopper locations between the outer yoke 20 and the lens holder 14 while FIG. 14 is an explanation view showing stopper locations between the lens holder 14 and the base 12.

As shown in FIG. 8, the outer ring end portion 204 of the outer yoke 20 has four yoke projections 204-1 each of which projects in the radial direction inwards. On the other hand, as shown in FIG. 9, the tubular portion 140 of the lens holder 14 has four holder upper projections 146 each of which projects upwards from an upper end thereof.

As shown in FIG. 13, when the lens holder 14 moves upwards, the four holder upper projections 146 engage with and stop at the corresponding four yoke projections 204-1 of the outer yoke 20, respectively. That is, the four yoke projections 204-1 of the outer yoke 20 act as an upper stopper (engaging/stopping member) for restricting an upward movement of the lens holder 14.

As shown in FIG. 12, the base 12 has four base projections 124 each of which projects upward at a circumference of the circular opening portion 12a. On the other hand, as shown in FIG. 11, the ring-shaped end portion 144 of the lens holder 14 has four holder lower projections 148 each of which projects downward.

As shown in FIG. 14, when the lens holder 14 moves downward, the four holder lower projections 148 engage with and stop at the corresponding four base projections 124 of the base 12, respectively. That is, the four base projections 124 of the base 12 serve as a lower stopper (engaging/stopping member) for restricting a downward movement of the lens holder 14.

Figure 15:
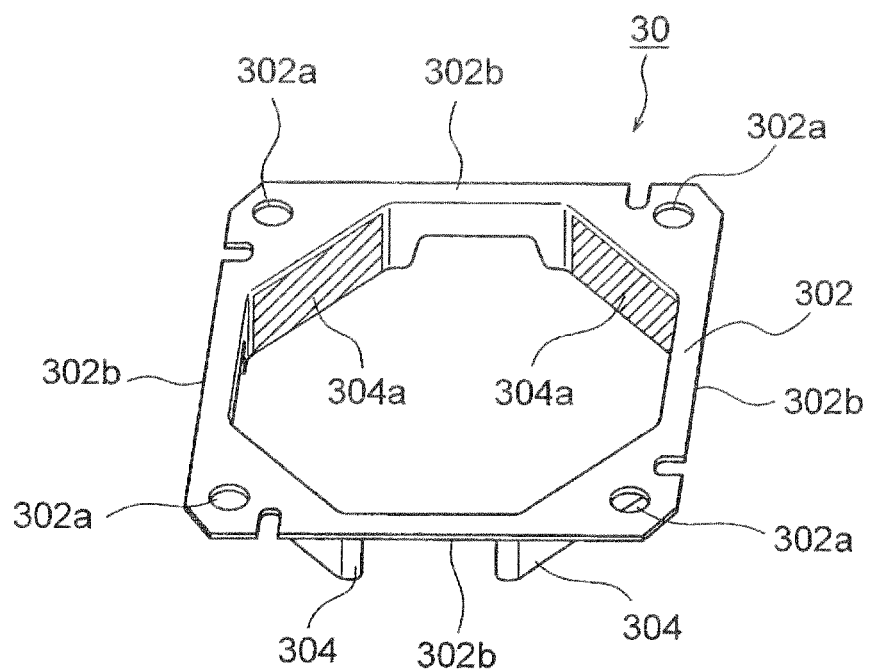
FIG. 15 is a perspective view of an inner yoke for use in the lens holder driving device illustrated in FIG. 1.
Figure 15:
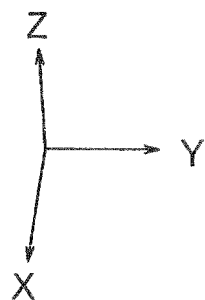
Figure 16:
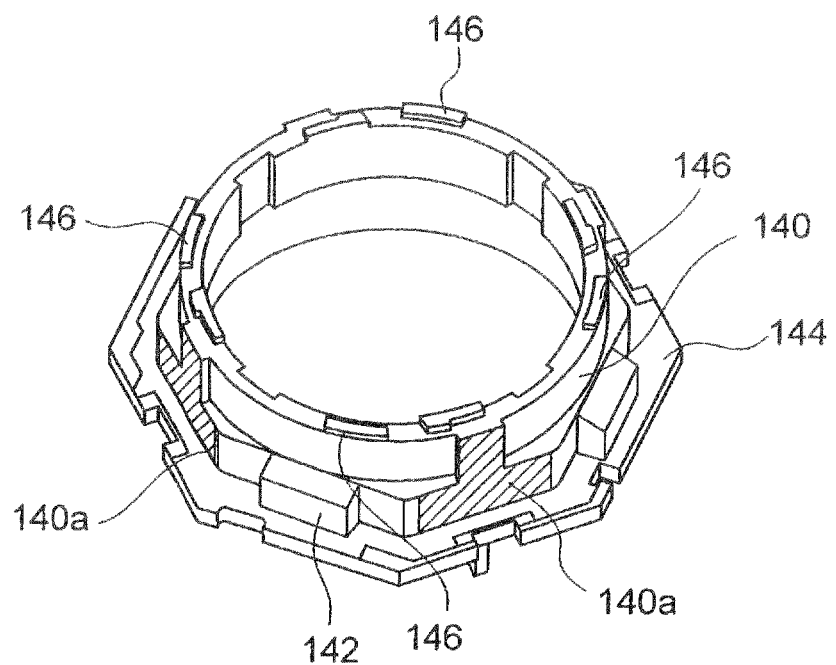
FIG. 16 is a perspective view of the lens holder for use in the lens holder driving device illustrated in FIG. 1.
Figure 16:
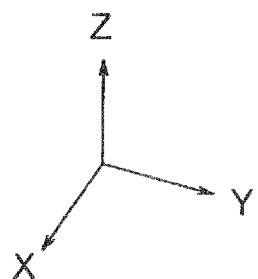
Figure 17:
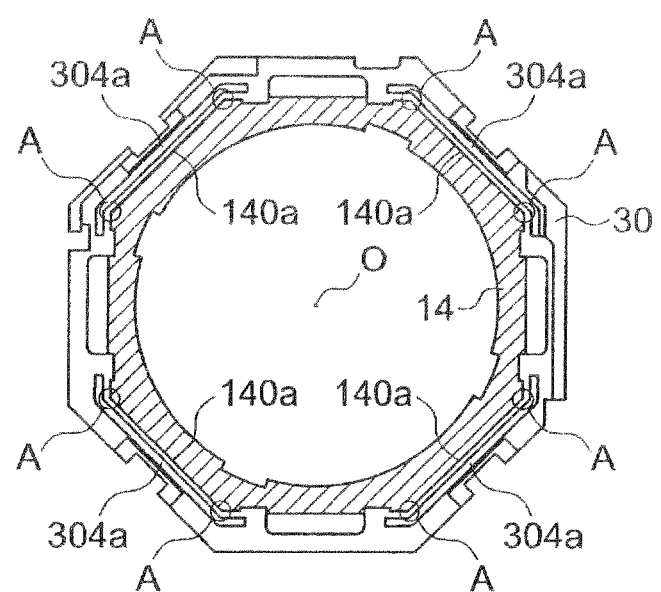
FIG. 17 is a transverse sectional view of an assembly into which the inner yoke and the lens holder are assembled.
Figure 17:
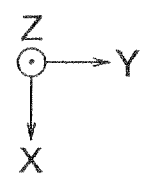
Figure 18:
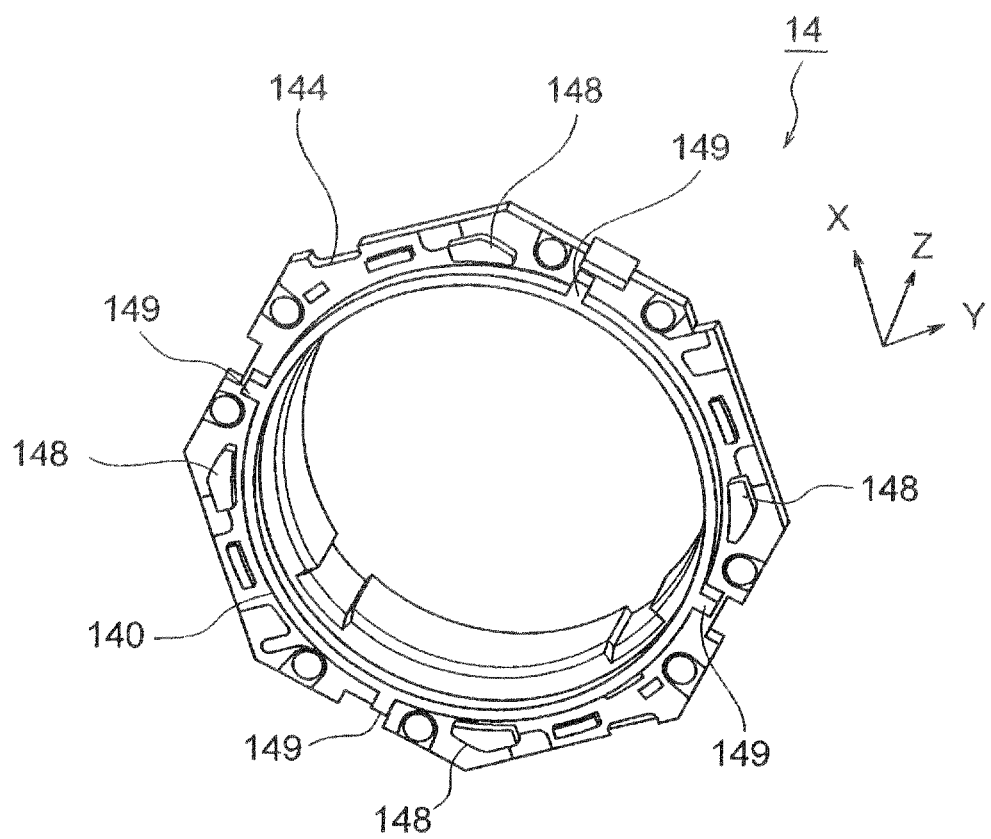
FIG. 18 is a perspective view of the lens holder illustrated in FIG. 16.
Figure 19:
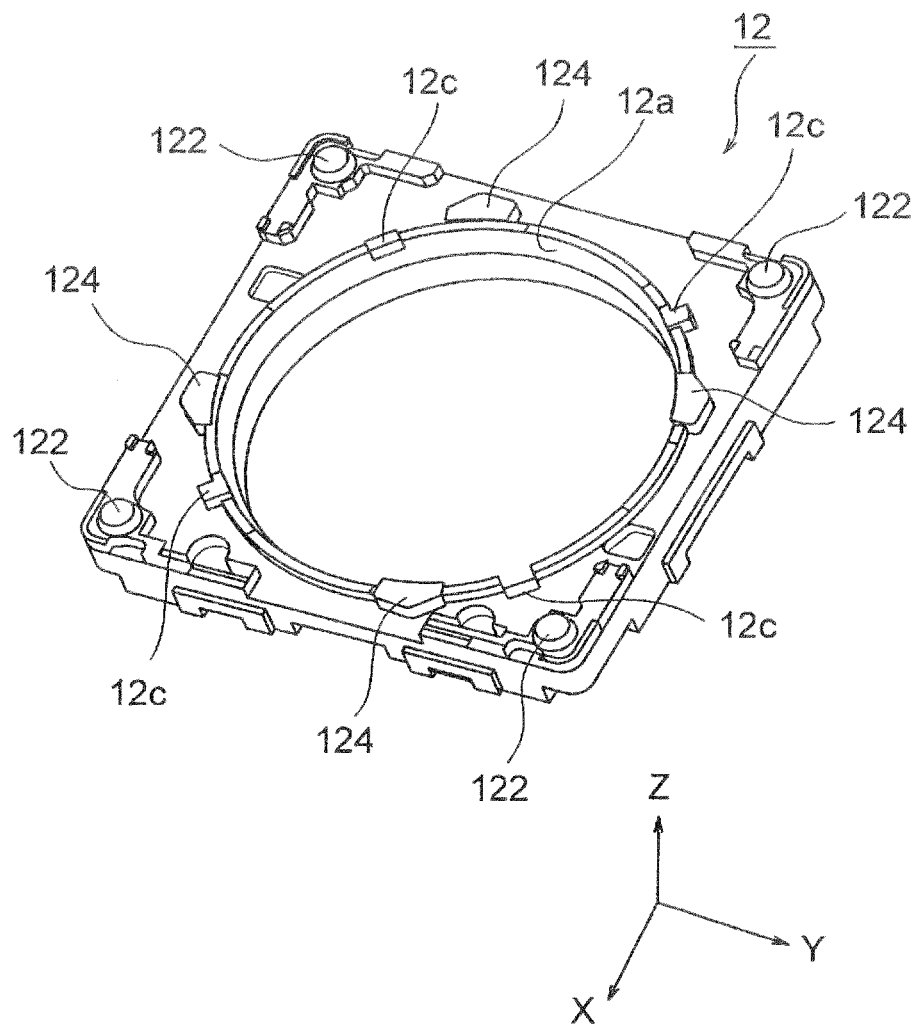
FIG. 19 is a perspective view of the base for use in the lens holder driving device illustrated in FIG. 1.
Figure 20:
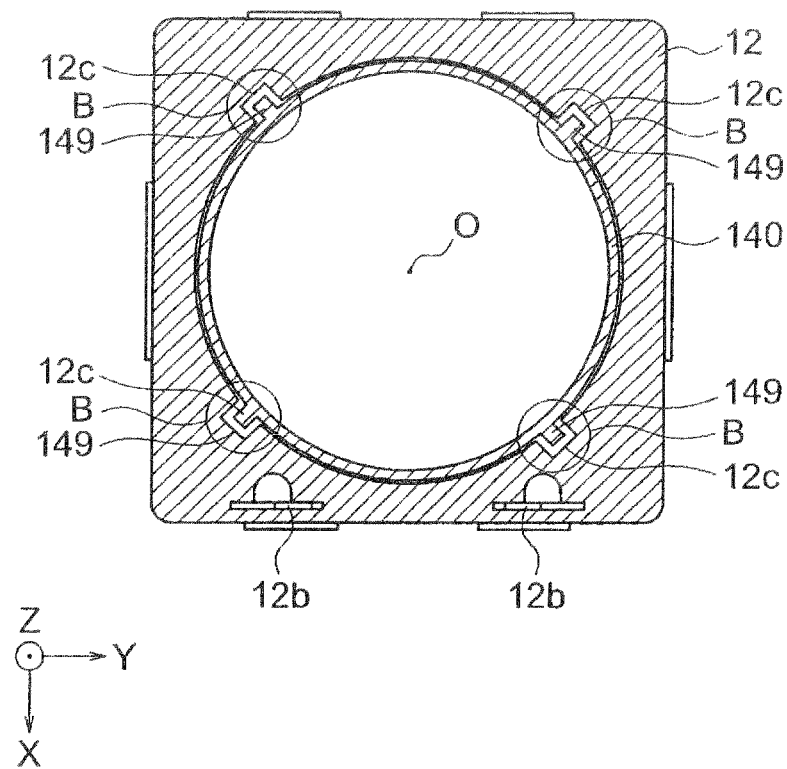
FIG. 20 is a transverse sectional view of an assembly into which the lens holder and the base are assembled.

Referring now to FIGS. 15 through 20, the description will proceed to a rotation restricting mechanism of the lens holder 14. FIG. 15 is a perspective view of the inner yoke 30 while FIG. 16 is a perspective view of the lens holder 14. FIG. 17 is a transverse sectional view of an assembly into which the inner yoke 30 and the lens holder 14 are assembled. FIG. 18 is a perspective view of the lens holder 14 while FIG. 19 is a perspective view of the base 12. FIG. 20 is a transverse sectional view of an assembly into which the lens holder 14 and the base 12 are assembled.

First, referring to FIGS. 15 through 17, the description will proceed to a top rotation restricting mechanism of the lens holder 14.

As shown in FIG. 15, the four vertical extending portions 304 of the inner yoke 30 have inner wall surfaces 304a. On the other hand, as shown in FIG. 16, the tubular portion 140 of the lens holder 14 has four outer wall surfaces 140a opposed to the inner wall surfaces 304a of the four vertical extending portions 304 with a predetermined spacing left therebetween.

Accordingly, when the lens holder 14 is about to rotate with respect to the inner yoke 30 around the optical axis O as shown in FIG. 17, the inner wall surfaces 304a of the four vertical extending portions 304 of the inner yoke 30 come into contact with the four outer wall surfaces 140a of the tubular portion 140 of the lens holder 14 at positions shown in A of FIG. 17, and it results in restricting the rotation of the lens holder 14.

Next, referring to FIGS. 18 through 20, the description will proceed to a bottom rotation restricting mechanism of the lens holder 14.

As shown in FIG. 18, the tubular portion 140 of the lens holder 14 has four engagement protrusions 149 projecting in a radial direction outwards from a lower end thereof. On the other hand, as shown in FIG. 19, the base 12 has, at a circumference of the circular opening portion 12a, four engagement grooves 12c in which the four engagement protrusions 149 are freely fitted, respectively.

Accordingly, when the lens holder 14 is about to rotate with respect to the base 12 around the optical axis O as shown in FIG. 20, the four engagement protrusions 149 of the lens holder 14 engage with the four engagement grooves 12c of the base 12 at positions shown in B of FIG. 20, and it results in restricting the rotation of the lens holder 14.

While this invention has been particularly shown and described with reference to the exemplary embodiment thereof, the invention is not limited to the embodiment. It will be understood by those of ordinary skill in the art that various changes in form and details may be therein without departing from the spirit and scope of the present invention as defined by the claims.

For example, although the yoke comprises the outer yoke 20 and the inner yoke (the counter yoke) 30 in the above-mentioned exemplary embodiment, the inner yoke (the counter yoke) 30 may be not provided. That is, the yoke may comprise the outer yoke 20 alone.

In addition, the shape of the permanent magnet piece 182 described above is merely an example thereof, of course, the shape of the permanent magnet piece 182 is not limited to the example, and the permanent magnet piece 182 may have other shapes such as a pillar shape, for example, a circular cylinder and so on.

Furthermore, it may be configured that the vertical extending portions 304 of the inner yoke 30 are disposed at positions opposite to side portions of the outer hollow cylindrical portion 202 of the outer yoke 20 while the permanent magnet pieces 182 are formed to a flat shape to be disposed to an inner wall portion in side portions of the outer hollow cylindrical portion 202 of the outer yoke 20 or to be disposed to the inner ring end portion 302 of the inner yoke 30.

The whole or part of the exemplary embodiments disclosed above can be described as, but not limited to, the following supplementary notes.

(Supplementary note 1) A lens holder driving device (10) comprising:

a lens holder (14) in which a lens assembly (11) is mounted;

a driving coil (16) fixed to said lens holder (14) at outside circumference thereof;

a magnet (18) opposite to said driving coil (16);

a yoke (20, 30) including said magnet (18);

an elastic member (22, 24) supporting said lens holder (14) in a direction of an optical axis (O) of said lens assembly (11) shiftably; and a base (12) disposed at a lower side of said lens holder (14), wherein said yoke (20, 30) comprises an outer yoke (20) including said magnet (18) at an inner wall surface thereof, wherein said elastic member (22, 24) comprises an upper elastic member (22) disposed at an upper side of said lens holder (14), said upper elastic member (22) being mounted to the inner wall of said outer yoke (20) in a state where said upper elastic member (22) is positioned and fitted to a spacer (28).

(Supplementary note 2) The lens holder driving device (10) according to Supplementary note 1, wherein said spacer (28) comprises a plurality of protrusions (282), wherein said upper elastic member (22) has a plurality of through holes (224a) through which the plurality of protrusions (282) pass, wherein said upper elastic member (22) is positioned and fitted to said spacer (28) by inserting the plurality of protrusions (282) in the plurality of through holes (224a) which correspond to thereto.

(Supplementary note 3) The lens holder driving device (10) according to Supplementary note 2, wherein said upper elastic member (22) is mounted to said spacer (28) by heat-welding tips of the plurality of protrusions (282).

(Supplementary note 4) The lens holder driving device (10) according to Supplementary note 3, wherein said yoke further comprises an inner yoke (30) which is heat-welded to said spacer (28).

(Supplementary note 5) The lens holder driving device (10) according to Supplementary note 4, wherein said outer yoke (20) comprises an outer hollow cylindrical portion (202) and an outer ring end portion (204) disposed an upper end of said outer hollow cylindrical portion (202), said outer ring end portion having an opening (204a), wherein said inner yoke (30) comprises an inner ring end portion (302) and vertical extending portions (304) extending in parallel with the optical axis (o) at an inside of said inner ring end portion (302).

(Supplementary note 6) The lens holder driving device (10) according to Supplementary note 5, wherein said magnet (18) comprises four permanent magnet pieces (182), wherein the outer hollow cylindrical portion (202) of said outer yoke (20) has a rectangular cylindrical shape in which the four permanent magnet pieces (182) are mounted to four corners thereof, wherein the inner ring end portion (302) of said inner yoke (30) has a rectangular ring-shape in which said vertical extending portions (304) are disposed at the inside of four corners thereof.

(Supplementary note 7) The lens holder driving device (10) according to Supplementary note 6, wherein the inner ring end portion (302) of said inner yoke (30) and said magnet (18) are apart from each other.

(Supplementary note 8) The lens holder driving device (10) according to Supplementary note 7, wherein said spacer (28) has heat-welded portions (282a) which are disposed between the inner ring end portion (302) of said inner yoke (30) and said magnet (18).

(Supplementary note 9) The lens holder driving device (10) according to Supplementary note 1, wherein said spacer (28) said upper elastic member (22) mounted to each other by adhesive.

(Supplementary note 10) The lens holder driving device (10) according to Supplementary note 9, wherein said yoke further comprises an inner yoke (30) which is mounted to said spacer (28) by adhesive.

(Supplementary note 11) The lens holder driving device (10) according to Supplementary note 10, wherein said outer yoke (20) comprises an outer hollow cylindrical portion (202) and an outer ring end portion (204) disposed an upper end of said outer hollow cylindrical portion (202), said outer ring end portion having an opening (204a), wherein said inner yoke (30) comprises an inner ring end portion (302) and vertical extending portions (304) extending in parallel with the optical axis (O) at an inside of said inner ring end portion (302).

(Supplementary note 12) The lens holder driving device (10) according to Supplementary note 11, wherein said magnet (18) comprises four permanent magnet pieces (182), wherein the outer hollow cylindrical portion (202) of said outer yoke (20) has a rectangular cylindrical shape in which the four permanent magnet pieces (182) are mounted to four corners thereof, wherein the inner ring end portion (302) of said inner yoke (30) has a rectangular ring-shape in which said vertical extending portions (304) are disposed at the inside of four corners thereof.

(Supplementary note 13) The lens holder driving device (10) according to Supplementary note 12, wherein the inner ring end portion (302) of said inner yoke (30) and said magnet (18) are apart from each other.

(Supplementary note 14) The lens holder driving device (10) according to Supplementary note 1, wherein said elastic member further comprises a lower elastic member (24) disposed at a lower side of said lens holder (14).

(Supplementary note 15) The lens holder driving device (10) according to Supplementary note 14, wherein said lower elastic member (24) comprises an inner end portion (242) mounted to said lens holder (14) and an outer end portion (244) mounted to said base (12.

(Supplementary note 16) The lens holder driving device (10) according to Supplementary note 1, wherein said base (12) mounts an image pickup device 13) thereon.

(Supplementary note 17) A camera (50) in which the lens holder driving device according to Supplementary note 16 is mounted.

In this connection, inasmuch as reference symbols in parentheses are attached in order to facilitate an understanding of this invention and are merely one example thereof, this invention is, of course, not limited to them.

What is claimed is:

1. A lens holder driving device comprising:
a lens holder in which a lens assembly is mounted;
a driving coil fixed to said lens holder at an outside circumference thereof;
a magnet opposite to said driving coil;
a yoke including said magnet;
an elastic member shiftably supporting said lens holder in a direction of an optical axis of said lens assembly; and
a base disposed at a lower side of said lens holder,
wherein said yoke comprises an outer yoke including said magnet at an inner wall surface thereof,
wherein said elastic member comprises an upper elastic member disposed at an upper side of said lens holder, said upper elastic member being mounted to the inner wall of said outer yoke in a state where said upper elastic member is positioned and fitted to a spacer,
wherein said spacer comprises a plurality of protrusions,
wherein said upper elastic member has a plurality of through holes through which the plurality of protrusions pass,
wherein said upper elastic member is positioned and fitted to said spacer by inserting the plurality of protrusions in the plurality of through holes which correspond thereto,
wherein said upper elastic member is mounted to said spacer by heat-welding tips of the plurality of protrusions, and
wherein said yoke further comprises an inner yoke which is heat-welded to said spacer.

2. The lens holder driving device as claimed in claim 1, wherein said outer yoke comprises an outer hollow cylindrical portion and an outer ring end portion disposed at an upper end of said outer hollow cylindrical portion, said outer ring end portion having an opening, and
wherein said inner yoke comprises an inner ring end portion and vertical extending portions extending in parallel with the optical axis at an inside of said inner ring end portion.

3. The lens holder driving device as claimed in claim 2, wherein said magnet comprises four permanent magnet pieces,
wherein the outer hollow cylindrical portion of said outer yoke has a rectangular cylindrical shape in which the four permanent magnet pieces are mounted to four corners thereof, and
wherein the inner ring end portion of said inner yoke has a rectangular ring-shape in which said vertical extending portions are disposed at the inside of four corners thereof.

4. The lens holder driving device as claimed in claim 3, wherein the inner ring end portion of said inner yoke and said magnet are apart from each other.

5. The lens holder driving device as claimed in claim 4, wherein said spacer has heat-welded portions which are disposed between the inner ring end portion of said inner yoke and said magnet.

6. The lens holder driving device as claimed in claim 1, wherein said elastic member further comprises a lower elastic member disposed at a lower side of said lens holder.

7. The lens holder driving device as claimed in claim 6, wherein said lower elastic member comprises an inner end portion mounted to said lens holder and an outer end portion mounted to said base.

8. The lens holder driving device as claimed in claim 1, wherein said base mounts an image pickup device thereon.

9. A camera in which the lens holder driving device as claimed in claim 8 is mounted.

10. A lens holder driving device comprising:
a lens holder in which a lens assembly is mounted;
a driving coil fixed to said lens holder at an outside circumference thereof;
a magnet opposite to said driving coil;
a yoke including said magnet;
an elastic member shiftably supporting said lens holder in a direction of an optical axis of said lens assembly; and
a base disposed at a lower side of said lens holder,
wherein said yoke comprises an outer yoke including said magnet at an inner wall surface thereof,
wherein said elastic member comprises an upper elastic member disposed at an upper side of said lens holder, said upper elastic member being mounted to the inner wall of said outer yoke in a state where said upper elastic member is positioned and fitted to a spacer,
wherein said spacer and said upper elastic member are mounted to each other by adhesive, and
wherein said yoke further comprises an inner yoke which is mounted to said spacer by adhesive.

11. The lens holder driving device as claimed in claim 10, wherein said outer yoke comprises an outer hollow cylindrical portion and an outer ring end portion disposed at an upper end of said outer hollow cylindrical portion, said outer ring end portion having an opening, and wherein said inner yoke comprises an inner ring end portion and vertical extending portions extending in parallel with the optical axis at an inside of said inner ring end portion.

12. The lens holder driving device as claimed in claim 11, wherein said magnet comprises four permanent magnet pieces, wherein the outer hollow cylindrical portion of said outer yoke has a rectangular cylindrical shape in which the four permanent magnet pieces are mounted to four corners thereof, and wherein the inner ring end portion of said inner yoke has a rectangular ring-shape in which said vertical extending portions are disposed at the inside of four corners thereof.

13. The lens holder driving device as claimed in claim 12, wherein the inner ring end portion of said inner yoke and said magnet are apart from each other.

14. The lens holder driving device as claimed in claim 10, wherein said elastic member further comprises a lower elastic member disposed at a lower side of said lens holder.

15. The lens holder driving device as claimed in claim 14, wherein said lower elastic member comprises an inner end portion mounted to said lens holder and an outer end portion mounted to said base.

16. The lens holder driving device as claimed in claim 10, wherein said base mounts an image pickup device thereon.

17. A camera in which the lens holder driving device as claimed in claim 16 is mounted.

* * * * *